United States Patent [19]

Maschino

[11] 3,875,059
[45] Apr. 1, 1975

[54] ELECTRIC FUEL PUMP STRAINER STAND-OFF
[75] Inventor: Dale C. Maschino, Flint, Mich.
[73] Assignee: General Motors Corporation, Detroit, Mich.
[22] Filed: Dec. 10, 1973
[21] Appl. No.: 423,139

[52] U.S. Cl................. 210/172, 210/416, 210/460
[51] Int. Cl............................................. B01d 35/02
[58] Field of Search.... 210/172, 251, 416, 460–461, 210/463, 359, 398; 417/313

[56] References Cited
UNITED STATES PATENTS

| 2,788,125 | 4/1957 | Webb | 210/172 |
|---|---|---|---|
| 2,923,411 | 2/1960 | Oster | 210/172 |
| 3,023,905 | 3/1962 | McDougal et al. | 210/172 |
| 3,108,005 | 10/1963 | McMichael | 210/172 |

Primary Examiner—Charles N. Hart
Assistant Examiner—F. F. Calvetti
Attorney, Agent, or Firm—K. H. MacLean, Jr.

[57] ABSTRACT

An improved immersible fuel pump strainer assembly including a housing having a tubular inlet portion extending from the housing for passing fuel from the interior of the fuel tank to a discharge line. An improved strainer assembly has a collar portion encircling the tubular inlet which supports a flexible cloth-like strainer portion about the open end of said inlet. Members extend axially from said tubular inlet and project beyond its open end to prevent the flexible strainer portion from collapsing about the open end of the inlet which would limit fuel flow through a relatively small area of the strainer portion.

1 Claim, 5 Drawing Figures

PATENTED APR 1 1975  3,875,059

ELECTRIC FUEL PUMP STRAINER STAND-OFF

The subject invention relates to an improved fuel pump and strainer assembly for use in fuel tanks.

It has long been recognized that it is desirable to provide a strainer about the inlet of a fuel line to prevent foreign particles in the tank from entering the fuel system. The present invention has a tubular inlet member about which a collar portion of a strainer assembly is supported. The collar portion is attached to an envelope of flexible cloth-like or fabric material which preferably is made of plastic. The envelope encircles the open end of the inlet to prevent foreign particles from entering the fuel line.

The illustrated embodiment of the subject improved fuel pump and strainer assembly has a tubular inlet. The suction at the pump inlet provided by the fuel pump tends to collapse the flexible cloth-like strainer portion against the open end of the tubular inlet. This restricts the flow of fuel through a relatively small area of the strainer and, consequently, the capacity of the fuel pump may be decreased. To prevent the collapse of the strainer, members are provided which extend from the tubular opening toward the surrounding strainer member, thereby permitting fuel to flow through the entire surface of the strainer.

Therefore, an object of the present invention is to provide an improved fuel pump and strainer assembly of the type having a tubular inlet in the fuel tank and having a strainer member of flexible material about the open end of the tubular inlet and members provided which extend beyond the open end of the tubular inlet to prevent the collapse of the flexible strainer against the end of the inlet, thereby limiting fuel flow through a small area of the strainer.

A further object of the present invention is to provide an improved fuel pump of the immersible type, including an integral housing and tubular inlet which extends from the housing and supports a flexible strainer whose collapse against the inlet is prevented by members which extend beyond the open end of said inlet.

Further objects and advantages of the present invention will be more readily apparent from the following detailed description, reference being had to the accompanying drawings in which a preferred embodiment is illustrated.

Figure 1:
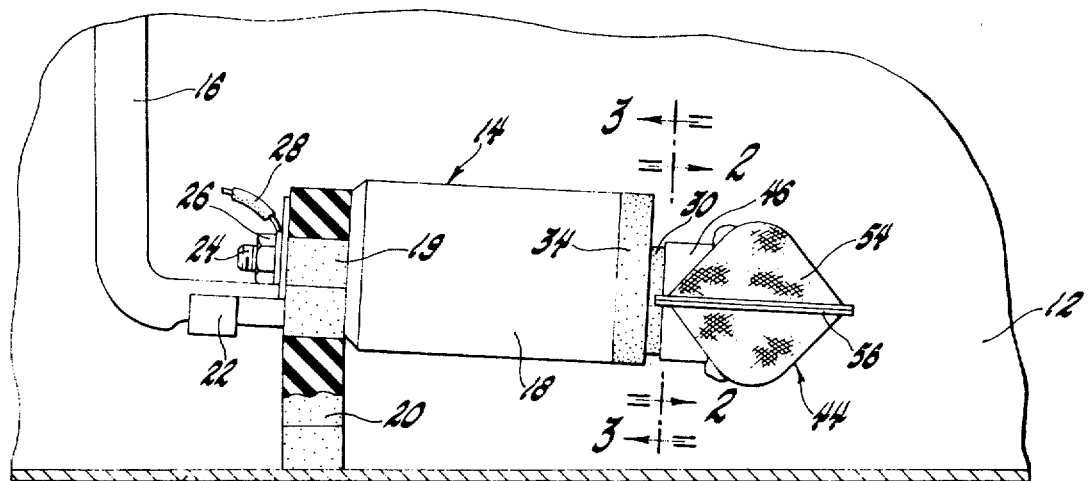
FIG. 1 is an elevational view of a fuel tank interior in which the subject improved fuel pump and strainer assembly is disposed.

In FIG. 1 of the drawings, a fuel tank 10 is illustrated enclosing an interior space 12 adapted to store liquid fuel. A combination electric fuel pump and strainer assembly 14 is supported within the interior 12 of tank 10 by a fuel discharge conduit 16 which extends upward from pump 14 and through the upper wall of the tank 10 to be fluidly connected to a vehicle engine. Pump assembly 14 includes a housing 18 which surrounds an electric motor and a fuel pump of the peripheral impeller type. For more specific details of the motor and fuel pump assembly, reference is made to U.S. Pat. No. 3,418,991 which was issued to Shultz on Dec. 31, 1968 and assigned to the General Motors Corporation.

The assembly 14 has an end extension 19 thereon which is encircled by a rubber bumper 20 which spaces the assembly 14 from the bottom wall of the tank 10. A bracket 22 is affixed at one end to assembly 14 and attached to conduit 16 at the other end to secure the assembly 14 in the tank. Terminals 24 (forward one being visible) have nut fasteners 26 thereon to attach power wires 28 to the assembly 14.

Figure 4:
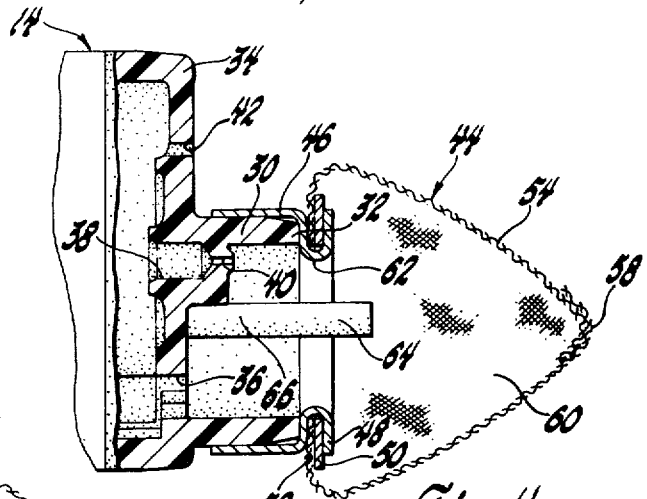
FIG. 4 is a sectioned view of the inlet and strainer assembly taken along section line 4—4 in FIG. 3.
Figure 5:
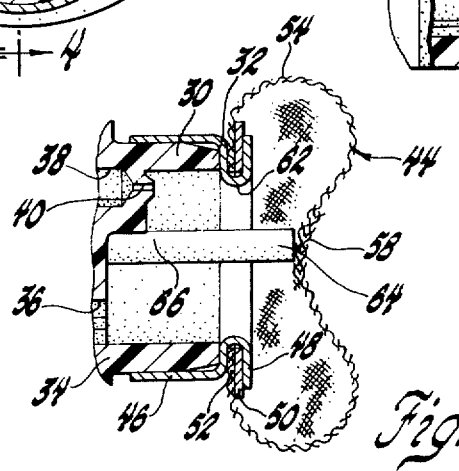
FIG. 5 is a view similar to FIG. 4 with the strainer portion partially collapsed.

A tubular inlet member 30 is best shown in FIGS. 4 and 5 and extends from housing 18. It has an open end 32 adapted to pass fuel from the interior 12 of tank 10 to the interior of housing 18. The tubular inlet 30 is an integral extension of cover member 34 which closes the end of housing 16 and also forms a portion of the pump housing as disclosed in the aforementioned patent. Cover member 34 has an opening 36 therein through which fuel is drawn from tank 10.

A central bore 38 in the cover 34 is adapted to support the end of an electric motor armature shaft. Bleed hole 40 provides a continuous flow of fuel through the bore 38 to lubricate the bearing. Another opening 42 in cover 34 discharges vaporous fuel from the pump interior back into the interior 12 of the tank 10 to improve pump performance. This is explained in more detail in the aforementioned patent.

The tubular inlet 30 supports an envelope like strainer assembly 44 and includes a metal collar portion 46 which grippingly engages the outer surface of the inlet 30. The end 48 of the metal collar 46 is first turned inward and then radially outward and axially pressed against an annular retainer member 50 to secure a portion 52 of strainer envelope 54 to the collar 46 and about the end 32 of the tubular inlet 30.

Figure 2:
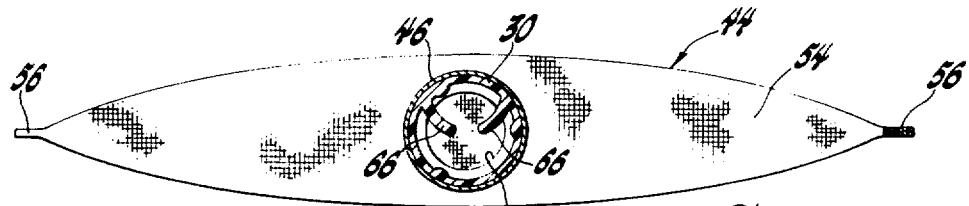
FIG. 2 is a sectioned view of the inlet and strainer assembly taken along section line 2—2 in FIG. 1.
Figure 3:
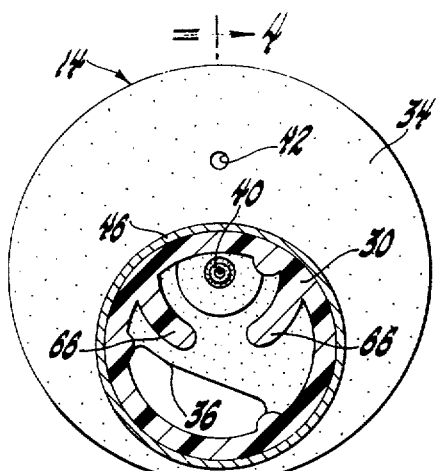
FIG. 3 is a sectioned view of the improved inlet and strainer assembly taken along section line 3—3 in FIG. 1.

The strainer envelope is made of a flexible material which may be of polyvinylidene chloride available commercially under the designation "Saran." The flexible material is formed into yarn and woven into cloth-like or fabric material which is then formed into the elongated shape shown in FIGS. 1 and 2. The ends 56 of the strainer are pressed together as shown in FIGS. 1 and 2 and sealed by well-known dielectric heating means. This sealing may otherwise be done by use of adhesive between pressed-together surfaces or by stapling. Likewise, the seam 58 shown in FIG. 4 completes the enclosure or envelope 60 about the open end 32 of the tubular inlet 30.

During a fuel pumping operation, there is a tendency to collapse or draw the strainer 54 against opening 32 which is caused by the suction of the pump through the inlet opening 36. Because the area of the inlet is relatively small compared to the total surface area of the strainer 54, the collapse of strainer 54 restricts the flow of fuel to the tubular inlet 30 and may undesirably decrease the output pressure of the fuel pump.

The illustrated fuel pump prevents strainer 54 from collapsing against the opening 62 by providing member 64 in the form of posts which extends from cover 34 through the tubular opening 30 and project from the open end 32 toward the strainer 54. In FIG. 5 the members 64 are shown engaging portions of strainer 54 to prevent its complete collapse over opening 62. Specifically, post member(s) 64 extend from curved wall means 66 within the tubular inlet 30. By preventing the collapse of strainer 54 over the opening 62, the total surface area of the strainer assembly 44 is utilized to filter fuel entering the inlet 30 so that fuel may flow more freely therethrough.

Although the embodiment illustrated is a preferred embodiment, other embodiments may be adapted.

What is claimed is as follows:

1. A combination fuel pump and strainer assembly of the immersible type adapted to be supported within a vehicle fuel tank by the fuel discharge line including a housing which encloses fuel pump means for drawing fluid from said tank and passing it into said discharge line, said housing having a tubular inlet portion extending therefrom with an open end, a fuel strainer assembly including an annular collar member engagingly encircling said inlet portion of the housing and defining an opening thereto, a fuel strainer of flexible and pervious material formed in a generally cylindrical configuration with an enclosed interior, an aperture in the wall of the strainer with its surrounding edge portion attached to said collar member around said collar opening, thereby causing fuel to flow first through said pervious strainer material and subsequently through said collar opening into said inlet of the housing to prevent foreign particles from entering the fuel pump and the discharge line, said housing having elongated members projecting from said inlet opening and through said collar opening into said interior of the strainer whereby the suction action of fuel flowing into said inlet is prevented from collapsing the flexible strainer material over the collar opening which would undesirably restrict flow through a limited portion of said strainer.

* * * * *